(12) United States Patent
Mealy (10) Patent No.: US 8,861,035 B1
(45) Date of Patent: Oct. 14, 2014

(54) THRESHOLD MATRIX DIFFUSION HALFTONING

(71) Applicant: Marvell International Ltd., Hamilton (BM)

(72) Inventor: James Mealy, Oviedo, FL (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/223,097

(22) Filed: Mar. 24, 2014

Related U.S. Application Data (62) Division of application No. 13/288,873, filed on Nov. 3, 2011, now Pat. No. 8,681,382.

(60) Provisional application No. 61/411,867, filed on Nov. 9, 2010.

(51) Int. Cl.
*H04N 1/405* (2006.01)
*G06K 15/02* (2006.01)

(52) U.S. Cl.
CPC ........ *G06K 15/1881* (2013.01); *G06K 15/1878* (2013.01)

USPC ....... 358/3.06; 358/3.03; 358/3.05; 358/3.09; 358/3.1; 358/534; 358/535; 358/536

(58) Field of Classification Search
None
See application file for complete search history.

(56) References Cited

U.S. PATENT DOCUMENTS

| | | |
|---|---|---|
| 5,898,505 A | 4/1999 | Lin et al. |
| 6,356,362 B1 | 3/2002 | Ostromoukhov |
| 6,356,363 B1 | 3/2002 | Cooper et al. |
| 6,501,564 B1 | 12/2002 | Schramm et al. |
| 6,989,913 B2 | 1/2006 | Asai |
| 7,420,708 B2 | 9/2008 | Mantell |
| 7,480,078 B2 | 1/2009 | Choi et al. |
| 2003/0020935 A1 | 1/2003 | Morimatsu |
| 2008/0291500 A1 | 11/2008 | Asai |
| 2009/0161131 A1 | 6/2009 | Fujimoto et al. |
| 2009/0207453 A1 | 8/2009 | Ike et al. |
| 2009/0244632 A1 | 10/2009 | Yoshimura |

*Primary Examiner* — Dung Tran (57) ABSTRACT

A contone source image is processed to create halftone outputs by identifying intensity thresholds based on the coordinates of the pixels of the source image. The halftone output corresponding to a particular pixel of the contone image in a particular color plane is determined by comparing the intensity of the pixel and any previously accumulated output error to the intensity threshold corresponding to the pixel.

20 Claims, 5 Drawing Sheets

THRESHOLD MATRIX DIFFUSION HALFTONING

CROSS REFERENCE TO RELATED APPLICATIONS

The present disclosure is a divisional of and claims priority to U.S. patent application Ser. No. 13/288,873, filed on Nov. 3, 2011, now U.S. Pat. No. 8,681,382, issued Mar. 25, 2014, which claims priority to U.S. Provisional Application No. 61/411,867, filed on Nov. 9, 2010, which are incorporated herein by reference.

TECHNICAL FIELD

This disclosure relates to data processing, and more particularly to processing image data to produce color halftone images.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

In order to facilitate the printing of images in a printing device, an image having continuous tones (also referred to as a "continuous tone image" or a "contone image") is often converted into an image having halftones. An example of a halftone image is an image whose pixels are binary, having one of two colors such as either black or white.

For example, a grayscale image is a contone image whose pixels range continuously from white to black, with various intermediate levels of gray. Many printers, however, are capable only of printing black dots, and are not capable of printing gray dots. Instead, such printers represent shades of gray by printing different densities of black dots. Thus, a lighter area has a lower density of black dots, and a darker area has a higher density of black dots.

Color printing is often based on a source image that comprises multiple contone images corresponding respectively to different color planes such as cyan, magenta, yellow, and black (CMYK). Before being printed, these contone images must be converted to halftone images.

Color halftoning can be performed using various existing techniques. As a simple example, the intensity of each source pixel can be compared to an intermediate intensity threshold, with pixels exceeding the intensity threshold being set to black, and pixels not exceeding the intensity threshold being set to white.

A more complex use of thresholds involves a so-called dither array, in a process referred to as amplitude-modulated (AM) or frequency-modulated (FM) digital halftoning. A dither array is a two-dimensional matrix of intensity thresholds that is tiled over the source image. For any particular source pixel, the coinciding value of the dither array is used as an intensity threshold. This has the effect of creating differently sized clusters of dots. The dither array is typically small relative to the source image, and comprises consecutive intensity thresholds arranged in a specific pattern relative to the array. In amplitude-modulated halftoning, the intensity thresholds are arranged consecutively along a path that spirals outwardly from the array's center. In frequency-modulated halftoning, the consecutive intensity thresholds are dispersed as much as possible within the array.

Error diffusion is another technique used in halftoning. Error diffusion is based on the recognition that there is a known quantization error whenever converting a continuous value to a binary value. Error diffusion keeps track of the quantization error and distributes the quantization error to neighboring pixels as processing proceeds through the pixels of an image. Thus, the binary value of each halftone pixel is determined both by the original value of the pixel and by any error that has accumulated during the processing of previous pixels. Floyd-Steinberg dithering is an example of a widely used error diffusion implementation.

Refinements to the halftoning techniques described above tend to focus on the reduction of unwanted discernable patterns that sometimes results from these techniques. As an example, some implementations utilize so-called blue-noise in conjunction with error diffusion to reduce the appearance of unnatural patterns in halftone images. Another technique is to increase the area over which accumulated quantization errors are distributed, or to otherwise manipulate the way in which errors are diffused to neighboring pixels.

Color halftoning introduces additional challenges as compared to the halftoning of monochrome images having only a single color plane. Many color halftoning methods process each color plane independently, without addressing the potential interaction of the different color planes with each other. Other methods account for such interaction, but only through expensive and performance-reducing post-processing. Furthermore, current methods often require serpentine scanning of the image in a manner that is not coherent with pen geometry, and therefore require large memory buffers.

SUMMARY

The present invention produces halftone outputs from a contone source image. In one aspect, a method is provided for producing halftone outputs corresponding to a pixel of a contone image. In the method, the pixel has (i) an X coordinate and (ii) a Y coordinate within each color plane of multiple color planes of the contone image, and the pixel has an intensity in each of the multiple color planes. Threshold logic is addressed with (i) the X coordinate and (ii) the Y coordinate to determine an intensity threshold for each color plane of the multiple color planes. Error in previously produced halftone outputs is accumulated for each color plane. For a given color plane, the method compares (i) the intensity and (ii) the accumulated error to the determined intensity threshold for the given color plane. A halftone outputs for the given color plane is based on the comparing.

In another aspect of the present invention, a printing device has scaling logic that is responsive to pixel intensity to produce (i) scaled X pixel coordinates and (ii) scaled Y pixel coordinates. The printer also has one or more threshold matrixes that are responsive to (i) the scaled X pixel coordinates and (ii) the scaled Y pixel coordinates to determine an intensity threshold. Error diffusion logic is responsive to a halftone output to indicate accumulated error in the halftone output, and threshold comparison logic compares (i) the pixel intensity and (ii) the accumulated error with the intensity threshold to produce the halftone output.

In yet another aspect of the present invention, a method is provided for producing a halftone output corresponding to a source pixel, wherein the source pixel has (i) an X coordinate, (ii) a Y coordinate and (iii) a source intensity. The method addresses threshold logic with (i) the X coordinate and (ii) the Y coordinate to determine an intensity threshold for the source pixel. Error in previously produced halftone outputs is accumulated. The method compares (i) the source intensity and (ii) the accumulated error to the determined intensity threshold to determine a halftone output corresponding to the source pixel.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments of the disclosure are illustrated by way of example and not by way of limitation in the figures of the accompanying drawings.

DETAILED DESCRIPTION

Figure 1:
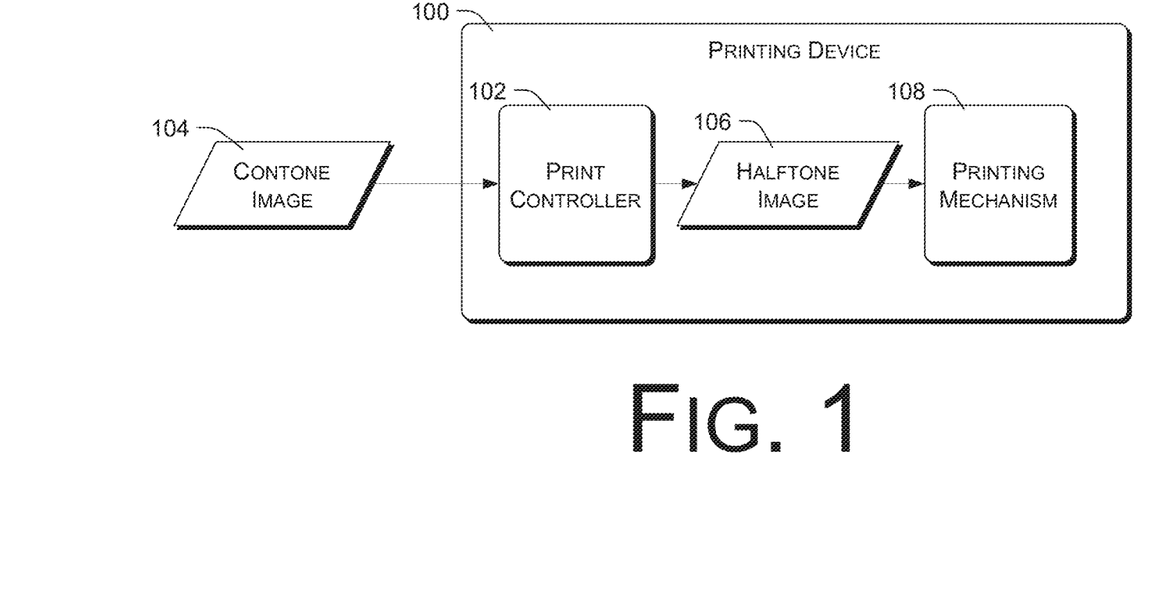
FIG. 1 is a simplified representation of a printing device that is configured to accept continuous tone images, to convert the continuous tone images to halftone images, and to print the halftone images.

FIG. 1 schematically illustrates an example printing device 100. The printing device 100 can be any appropriate device (e.g., a monochrome printer, a color printer, a laser printer, an inkjet printer, and/or the like) that prints images on a print medium (e.g., a paper). The printing device 100 includes a print controller 102 configured to receive a contone image 104 from an appropriate source (e.g., a computing device, a laptop, a desktop, a camera, an appropriate consumer electronic device, and/or the like, not illustrated in FIG. 1). The print controller 102 is further configured to generate a halftone image 106 corresponding to the contone image 104. The printing device 100 also includes a print mechanism 108 configured to receive the halftone image 106 from the print controller 102, and to print an image on a print medium based at least in part on the halftone image 106.

Although illustrated to be a part of the printing device 100, in various other embodiments the print controller 102 may be external to the printing device 100. In some of these embodiments, the print controller 102 generates a halftone image 106 from the contone image 104, and transmits the halftone image 106 to the printing device 100 (e.g., to the print mechanism 108).

Color Plane Halftoning

Figure 2:
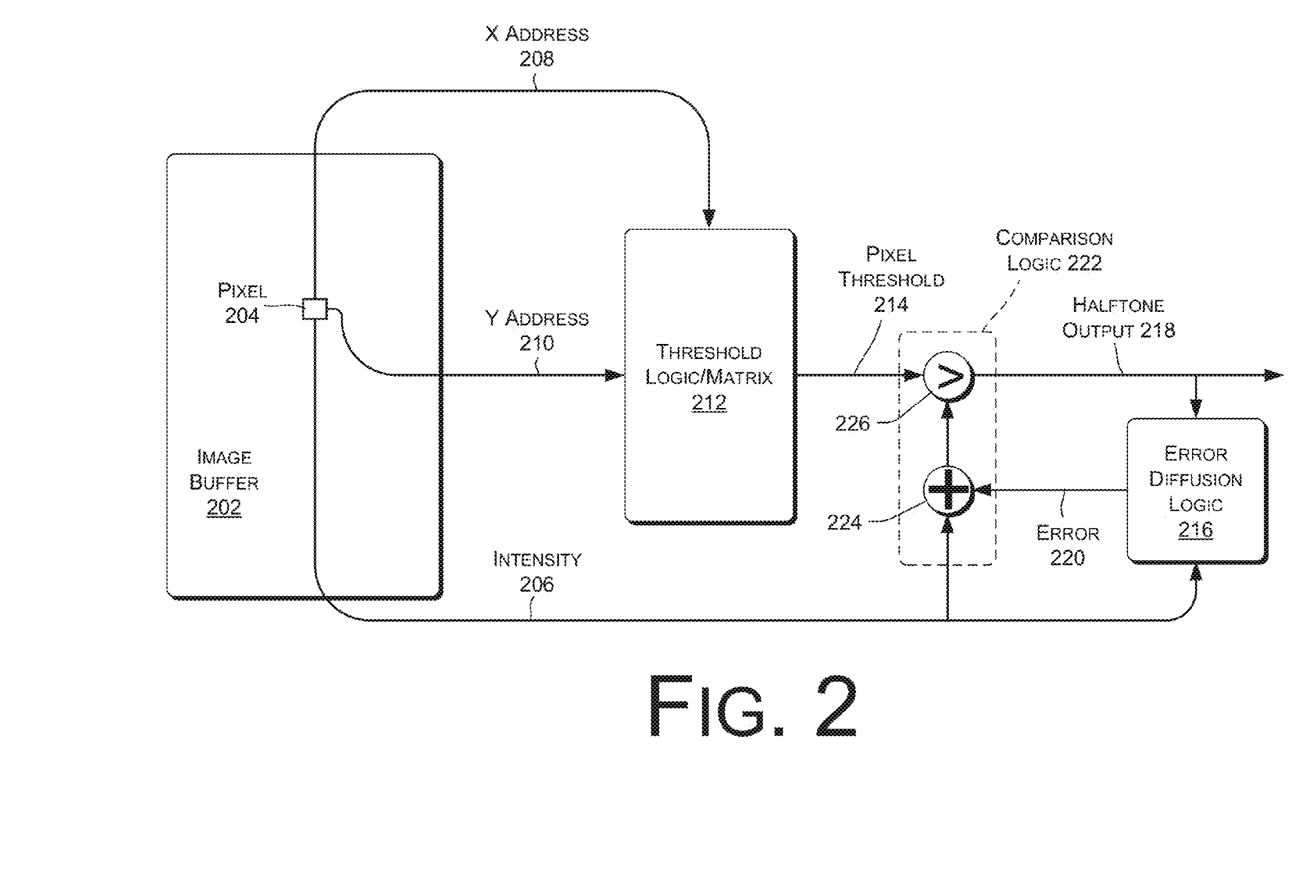
FIG. 2 is a schematic representation of a method of converting a halftone image to a sequence of halftone outputs.

FIG. 2 schematically illustrates a method performed by the print controller 102 of producing halftone outputs corresponding respectively to pixels of the contone image 104. The contone image 104 is represented in FIG. 2 as being stored in an image buffer 202. The contone image 104, as stored in the image buffer 202, comprises multiple pixels, arranged in two dimensions according to X and Y coordinates or addresses.

FIG. 2 illustrates processing with respect to a single color plane. For a color contone image, which has multiple color planes, the method illustrated by FIG. 2 is replicated for each color plane. Thus, the techniques described herein allow each color plane to be processed and converted independently of the other color planes. As will become apparent, however, the method addresses and tends to minimize undesirable interactions between the color planes.

FIG. 2 illustrates processing of a single pixel 204 (of the contone image 104) that has an intensity 206. Generally, the intensity of a pixel corresponds to its brightness or saturation. The pixel 204 has an X address or coordinate 208 and a Y address or coordinate 210. The X and Y coordinates correspond to the X and Y coordinates (in pixels) of the pixel 204 with respect to the contone image 104.

Each pixel 204 of the contone image 104 can have a different intensity for each of its respective color planes. Within each color plane, pixels are processed individually, in sequence; such as by processing the pixels of an individual row from left to right, followed by the pixels of the next lower row, and so on. Each continuous-valued pixel of the color plane is the basis for a corresponding binary, halftone output.

The embodiment shown has threshold logic 212 that determines an intensity threshold 214 for each pixel of the contone image 104, based at least in part on the coordinates (or address) of the pixel within the contone image 104. In this embodiment, the threshold logic 212 comprises a matrix or two-dimensional array that is addressed in its two dimensions by the X address 208 and the Y address 210 of the current pixel 204. The value stored at the addressed location of the matrix is output as the intensity threshold 214. The threshold logic 212 will be referred to as a threshold matrix 212 when referencing the embodiment of FIG. 2.

The values held by the threshold matrix 212 are arranged in a two-dimensional pattern that tends to produce cyclical or oscillating bands of threshold values as the matrix 212 is traversed in a straight or curved line relative to its X and Y dimensions. In the described embodiment, the threshold matrix 212 is small in comparison to the original image and the image buffer 202, and may be addressed by the lower-order bits of the original X and Y image coordinates. This results in a tiled relationship between the original image and the threshold matrix, wherein the threshold matrix is repeated over both dimensions of the contone image 104. Further characteristics of the threshold matrix 212 will be described below.

The intensity threshold 214 is used in conjunction with error diffusion logic 216 to produce a binary halftone output 218. The error diffusion logic 216 may be implemented in accordance with known error diffusion techniques, including Floyd-Steinberg error diffusion techniques. Generally, the error diffusion logic 216 receives, for each converted pixel, a corresponding halftone output 218 and intensity 206 of the pixel. The error diffusion logic 216 calculates the difference or error between the halftone output 218 and the intensity 206, and accumulates the error in previously produced halftone outputs. The accumulated error is distributed at 220.

Comparison logic 222 is responsive to the intensity 206, the accumulated error 220, and the intensity threshold 214 to produce the halftone output 218. More specifically, the comparison logic 222 compares the intensity 206 and the accumulated error 220 to the determined intensity threshold 214. The halftone output 218 is based on the result of the comparison. In the illustrated embodiment, an adder 224 sums or otherwise combines the intensity 206 of the pixel 204 and the currently accumulated output error 220. The result is compared by a comparator 226 to the intensity threshold 214 corresponding to the pixel 204, and the result of the comparison forms the halftone output 218. The halftone output 218 may be either "on" or "off," depending whether or not the sum of the intensity 206 and the accumulated error are greater or less than the intensity threshold 214.

Threshold Matrix Examples

FIGS. 3-6 illustrate further details regarding the nature of the threshold matrix 212 in certain embodiments.

Figure 3:
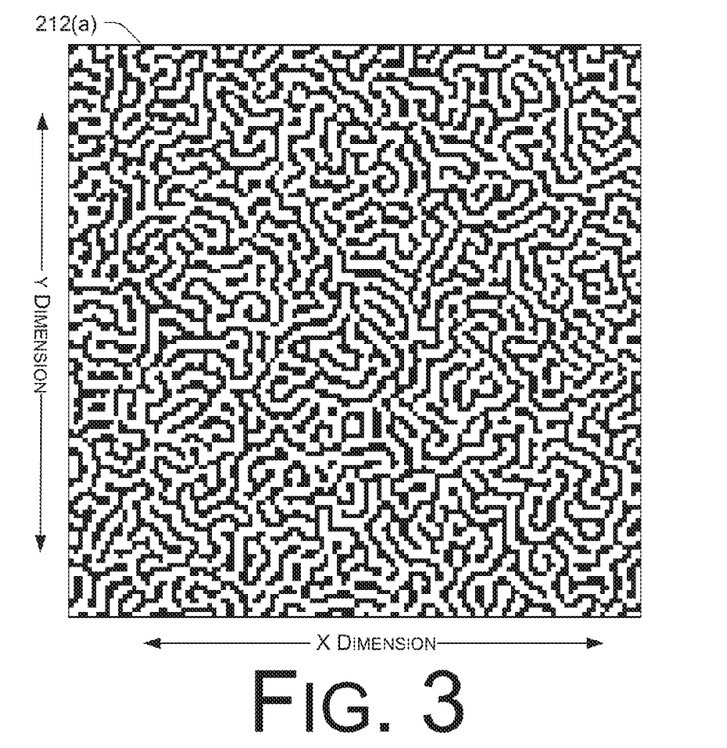
FIG. 3 is a graphic representation of a threshold matrix that may be used in conjunction with the method of FIG. 2.

FIG. 3 illustrates one possible embodiment of the matrix 212, designated by reference numeral 212(a). The matrix 212(a) is a two-dimensional array of binary values, in which each value represents either a low threshold or a high threshold. For example, areas illustrated as black might represent a high threshold, while areas illustrated as white or blank might represent a low threshold. The high and low thresholds are arranged in a pattern such that traversal across the matrix, in a sequence of X and Y coordinates that form a line, is likely to produce an alternating or repeating cycle of threshold values.

Figure 4:
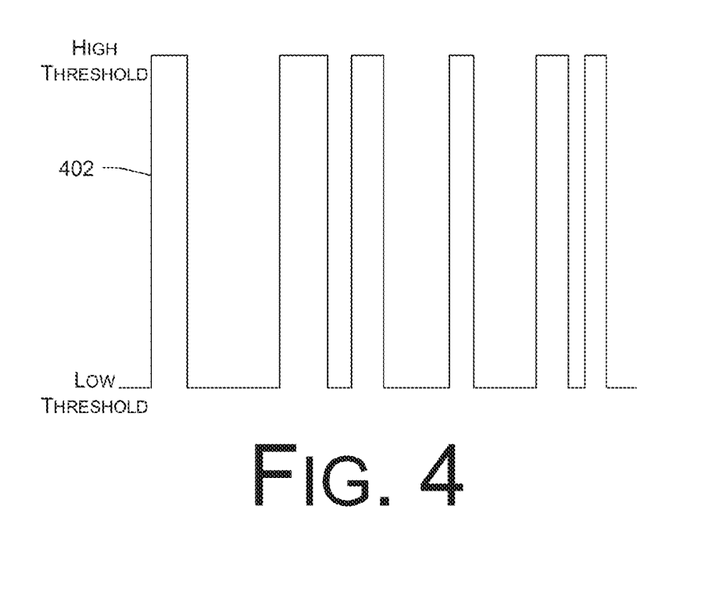
FIG. 4 is a graph showing an example of an output waveform that might be generated by the threshold matrix of FIG. 3.

FIG. 4 shows a waveform 402 corresponding to a sequence of threshold values that may result from traversal across the matrix 212(a). The waveform 402 illustrates how the output of the threshold matrix 212(a) may cycle as the matrix is traversed in any direction. As shown, the waveform 402 cycles between the low threshold and the high threshold, at a rate that is not necessarily regular. The rate and regularity of the waveform 402 may vary depending on the nature of the matrix 212 and the particular route of traversal across the matrix 212(a).

Appropriate configuration of the matrix 212(a) allows the creation of preferred dot placement zones within the output halftone image. This is because each location of the threshold matrix 212(a) is addressed by a particular corresponding location of the image contone image 104, and because a low threshold at a particular location is more likely than a high threshold to produce an "on" halftone output or dot placement at that location. Therefore, zones of preferred dot placement are created by corresponding zones of low thresholds within the matrix 212(a). That is, dots are more likely to be placed in areas corresponding to blank areas of the illustrated matrix 212(a). Furthermore, the pattern of the matrix 212(a) is configured so that it exhibits relatively little perceptible repetition over its two dimensions. Because of this, the preferred dot placement zones within the output halftone image are less likely to result in perceptible patterning.

The matrix pattern of FIG. 3 can be created using fractal generation techniques. In particular, the pattern of FIG. 3 was generated using a Reaction Diffusion (RD) simulation. RD can produce a wide range of patterns that mimic the fractal textures seen in nature, such as fingerprints, zebra stripes, giraffe reticulated coloration, and so forth. Note that although patterns such as these work well in the environment described herein, other types of patterns may also be found or created, and may be used in place of the illustrated fingerprint-like pattern.

Figure 5:
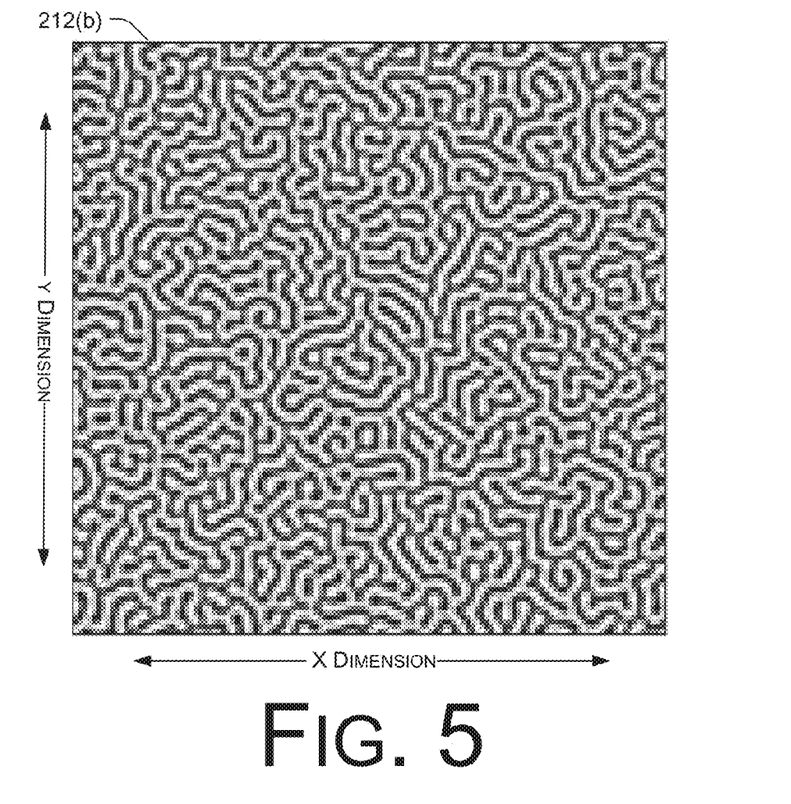
FIG. 5 is a graphic representation of another threshold matrix that may be used in conjunction with the method of FIG. 2.

FIG. 5 shows a threshold matrix 212(b) having threshold values that are not limited to binary values. For example, the values in this example may range from 0 to 100, representing a range of thresholds from low to high, such as from 0% to 100%. In FIG. 5, the values are represented in varying shades of gray, with lighter shades representing lower thresholds and darker shades representing higher thresholds. The matrix 212 (b) of FIG. 5 has a pattern similar to that of the matrix 212(a) of FIG. 3, where any traversal across the matrix is likely to produce oscillating cycles of threshold values. In this case, however, the cycles form triangular cycles rather than rectangular cycles.

Figure 6:
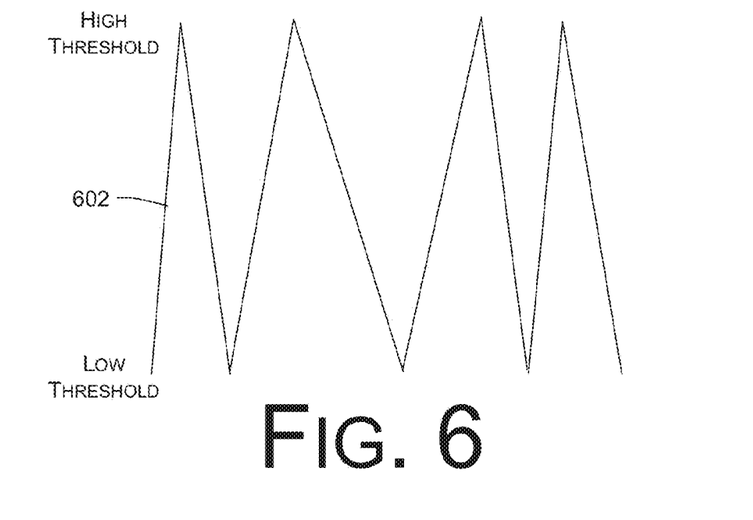
FIG. 6 is a graph showing an example of an output waveform that might be generated by the threshold matrix of FIG. 5.

FIG. 6 shows a waveform 602 corresponding to a sequence of threshold values that may result from traversal across the matrix 212(b) of FIG. 5. Because the matrix 212(b) has a more continuous range of values, the waveform is roughly triangular rather than rectangular. The waveform 602 in this example oscillates repeatedly between the extreme highest possible threshold and the extreme lowest possible threshold, and crosses a range of intermediate thresholds as it traverses between the two extreme thresholds.

Again, preferred placement zones can be created by appropriate pattern selection, with dot outputs being more likely in lighter areas of the pattern. The pattern is generated using fractal generation techniques such that it exhibits a low degree of perceptible repetition and/or patterning.

Multiple Plane Halftoning

When processing a color image, the arrangement of FIG. 2 can simply be replicated for each color plane, or multiple color planes can be processed independently using the same set of components. In other words, the steps and operations described above are performed for and with respect to each color plane, independently and possibly in parallel.

It may be useful in some implementations to use a differently configured threshold matrix 212 when processing different color planes, to encourage dot placement in different locations, respectively, for each of the different color planes. The use of different threshold patterns for respective color planes can be helpful in reducing pixel stacking, which might otherwise degrade print output. It may also be helpful in addressing other problems arising from color plane interactions.

For example, two different threshold matrixes may have the same pattern, but have values that are inverted relative to each other: at a particular location the first matrix may have a low threshold while the second matrix has a high threshold, and vice versa. Manipulation of more than two threshold matrixes may be performed in an analogous manner, for processing more than two color planes.

Alternatively, a single threshold matrix 212 may be used, and its output may be manipulated by an additional lookup table or other type of processing that is dependent on the color plane currently being processed. For example, a matrix similar to that shown in FIG. 5 may be created that uses four threshold values, which may be represented symbolically as A, B, C, and D. For purposes of converting a first color plane such as Cyan, A may be defined as the lowest possible threshold and D as the highest possible threshold, with B and C representing intermediate thresholds. For purposes of converting a second color plane such as Magenta, B may be defined as the lowest possible threshold and A as the highest possible threshold, with C and D representing intermediate thresholds. For purposes of converting a third color plane such as Yellow, C may be defined as the lowest possible threshold and B as the highest possible threshold, with D and A representing intermediate thresholds. For purposes of converting a fourth color plane such as Black, D may be defined as the lowest possible threshold and C as the highest possible threshold, with A and B representing intermediate thresholds.

Varying the thresholds in this manner, while maintaining a common spatial pattern, encourages dots of different color planes to be placed in mutually exclusive locations, while also avoiding the perception of patterning. Note that the described halftoning scheme does not forbid or prevent pixel stacking, but it does "discourage" it by the placement of relatively higher thresholds in certain locations for certain color planes.

Scaled Threshold Addressing

Figure 7:
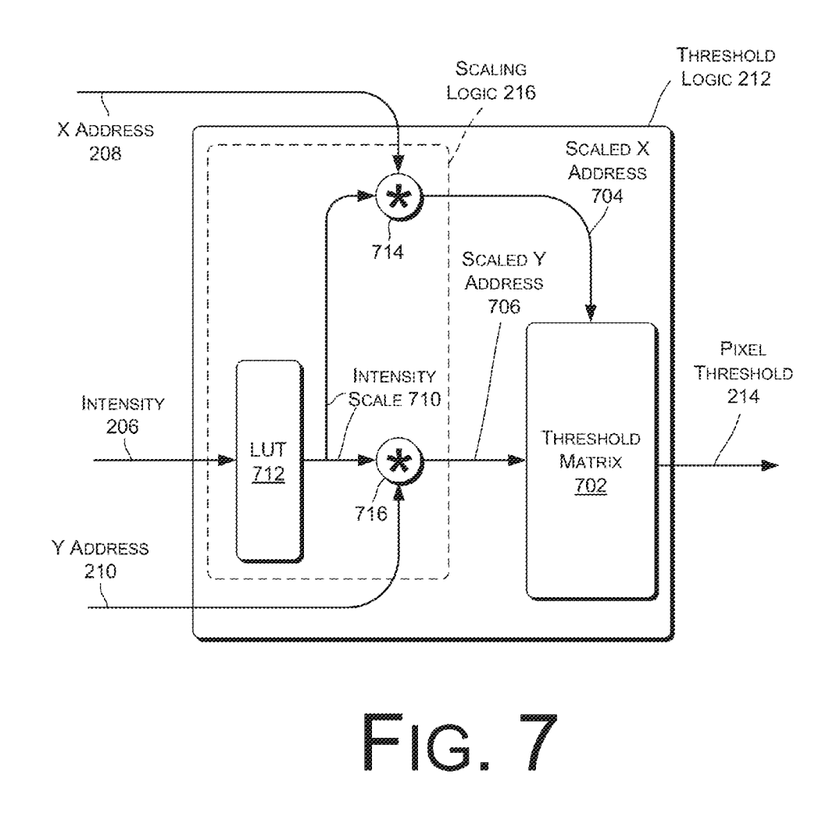
FIG. 7 is a schematic representation of threshold logic that may be used in the method illustrated by FIG. 2.

FIG. 7 illustrates an alternative implementation of the threshold logic 212 of FIG. 2. This embodiment uses a threshold matrix 702, which is similar or identical to the threshold matrixes described above. However, rather than being addressed directly by the X address 208 and the Y address 210 of the pixel 204, the threshold matrix 702 is addressed by scaled address values: a scaled X address 704 and a scaled Y address 706. The scaled X address 704 is a scaled version of the X address 208. The scaled Y address 706 is a scaled version of the Y address 210.

The scaling of the X and Y addresses is performed as a function of the intensity 206. More specifically, the original X and Y addresses are scaled by the square root of the intensity 206, and the scaled X and Y addresses 704 and 706 are used to address the threshold matrix 702.

In the illustrated embodiment, an intensity scale 710 is generated by a lookup table (LUT) 712. The lookup table 712 is configured to implement a square root function or similar function, based on the intensity 206 of the pixel 204. A multiplier 714 is responsive to the intensity scale 710 and the X address 208, multiplying the X address 208 by the intensity scale 710 to produce the scaled X address 704. A multiplier 716 is responsive to the intensity scale 710 and the Y address 210, multiplying the Y address 210 by the intensity scale 710 to produce the scaled Y address 706.

Scaling the X and Y address values as a function of pixel intensity causes the threshold matrix 702 to be traversed slowly for areas of low pixel intensity, and at increasingly higher traversal rates as pixel intensities of the original image increase. This allows the rate of placement zone cycling to mimic the typical or expected dot spacing for different pixel intensities. Thus, preferred placement zones will repeat at a higher rate when source pixels are of higher intensity.

CONCLUSION

The techniques described above allow color halftoning to be performed in multiple color planes. The techniques allow independent processing of each color plane, while potentially reducing undesirable interactions between the different color planes. In certain environments, the described techniques may eliminate the need for serpentine processing of contone images, thereby increasing the efficiency and reducing the costs of such processing.

In accordance with various embodiments, an article of manufacture may be provided that includes a storage medium having instructions stored thereon that, if executed, result in the operations described above. In an embodiment, the storage medium comprises some type of non-transitory memory (not shown). In accordance with various embodiments, the article of manufacture may be a computer-readable medium such as, for example, software or firmware.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The logic and functionality described herein may be implemented by any such components.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This application is intended to cover any adaptations or variations of the embodiments discussed herein. Therefore, it is manifestly intended that embodiments in accordance with the present disclosure be limited only by the claims and the equivalents thereof.

What is claimed is:

1. A printing device comprising a print controller configured to:
   determine an intensity threshold value for at least one color plane of multiple color planes of a contone image, wherein
      the intensity threshold value for the at least one color plane is based, at least in part, on address threshold logic of a pixel having (i) an X coordinate and (ii) a Y coordinate in an X-Y coordinate system within the at least one color plane,
      the pixel has an intensity in the at least one color plane,
      the threshold logic comprises a threshold matrix addressable by the X-Y coordinate system, and
      traversing across the threshold matrix in a sequence of X coordinates and/or Y coordinates that form a line or curve in the X-Y coordinate system produces an irregular or cyclic sequence of intensity threshold values;
   accumulate error in previously produced halftone outputs for the at least one color plane;
   for the at least one color plane, compare (i) the intensity and (ii) the accumulated error to the determined intensity threshold value to determine a halftone output corresponding to the pixel for the at least one color plane, wherein the halftone output corresponding to the pixel for the at least one color plane is based on the comparing; and
   produce the halftone output corresponding to the pixel determined for the at least one color plane.

2. The printing device of claim 1, wherein the threshold logic comprises a different threshold matrix for each of the multiple color planes of the contone image.

3. The printing device of claim 1, wherein the threshold logic is configured to create different preferred output placement zones for each of the multiple color planes of the contone image.

4. The printing device of claim 1, wherein the intensity threshold value varies depending on the at least one color plane of the multiple color planes of the contone image.

5. The printing device of claim 1, wherein the print controller is configured to scale (i) the X coordinates and (ii) the Y coordinates as a function of the pixel intensity prior to addressing the threshold logic with (i) the X coordinates and (ii) the Y coordinates.

6. The printing device of claim 1, wherein the print controller is configured to scale (i) the X coordinates and (ii) the Y coordinates as a square root function of the pixel intensity prior to addressing the threshold logic with (i) the X coordinates and (ii) the Y coordinates.

7. The printing device of claim 1, wherein the print controller is configured to distribute the accumulated error for the at least one color plane in accordance with an error diffusion scheme.

8. The printing device of claim 1, wherein the threshold matrix is configured to create repeating bands of preferred output placement.

9. The printing device of claim 1, wherein the threshold matrix is based on a reaction diffusion simulation.

10. A non-transitory computer-readable storage media storing computer-executable instructions that, when executed by one or more programmable processors, configure the one or more processors to perform operations comprising:
  determining an intensity threshold value for at least one color plane of multiple color planes of a contone image, wherein
    the intensity threshold value for the at least one color plane is based, at least in part, on address threshold logic of a pixel having (i) an X coordinate and (ii) a Y coordinate in an X-Y coordinate system within the at least one color plane,
    the pixel has an intensity in the at least one color plane,
    the threshold logic comprises a threshold matrix addressable by the X-Y coordinate system, and
  traversing across the threshold matrix in a sequence of X coordinates and/or Y coordinates that form a line or curve in the X-Y coordinate system produces an irregular or cyclic sequence of intensity threshold values;
  accumulating error in previously produced halftone outputs for the at least one color plane;
  for the at least one color plane, comparing (i) the intensity and (ii) the accumulated error to the determined intensity threshold value to determine a halftone output corresponding to the pixel for the at least one color plane, wherein the halftone output corresponding to the pixel for the at least one color plane is based on the comparing; and
  producing the halftone output corresponding to the pixel determined for the at least one color plane.

11. The computer-readable storage media of claim 10, wherein the threshold logic comprises a different threshold matrix for each of the multiple color planes of the contone image.

12. The computer-readable storage media of claim 10, wherein the threshold logic is configured to create different preferred output placement zones for each of the multiple color planes of the contone image.

13. The computer-readable storage media of claim 10, wherein the intensity threshold value varies depending on the at least one color plane of the multiple color planes of the contone image.

14. The computer-readable storage media of claim 10, wherein the operations further comprise scaling (i) the X coordinates and (ii) the Y coordinates as a function of the pixel intensity prior to addressing the threshold logic with (i) the X coordinates and (ii) the Y coordinates.

15. The computer-readable storage media of claim 10, wherein the operations are configured to scale (i) the X coordinates and (ii) the Y coordinates as a square root function of the pixel intensity prior to addressing the threshold logic with (i) the X coordinates and (ii) the Y coordinates.

16. The computer-readable storage media of claim 10, wherein the operations further include distributing the accumulated error for the at least one color plane in accordance with an error diffusion scheme.

17. A printing device comprising a print controller configured to:
  address threshold logic with (i) an X coordinate and (ii) a Y coordinate of a source pixel to determine an intensity threshold for the source pixel;
  accumulate error in previously produced halftone outputs;
  for a given color plane, compare (i) a source intensity of the source pixel and (ii) the accumulated error to the determined intensity threshold to determine a halftone output corresponding to the source pixel for the given color plane, wherein the halftone output corresponding to the source pixel for the given color plane is based, at least in part, on the comparing;
  scale (i) the X coordinate and (ii) the Y coordinate as a square root function of the source intensity prior to addressing the threshold logic; and
  produce, via the print controller, the halftone output corresponding to the source pixel determined for the given color plane.

18. The printing device of claim 17, wherein the threshold logic comprises a two-dimensional matrix addressable by (i) the X coordinate and (ii) the Y coordinate.

19. The printing device of claim 17, wherein the threshold logic is configured to produce a cyclical pattern of intensity thresholds as it is traversed through (i) the X coordinate and (ii) the Y coordinate.

20. The printing device of claim 17, wherein the print controller is further configured to scale (i) the X coordinate and (ii) the Y coordinate as a function of the source intensity prior to addressing the threshold logic.

* * * * *